(12) United States Patent
Imanishi

(10) Patent No.: US 12,040,518 B2
(45) Date of Patent: Jul. 16, 2024

(54) FUEL CELL MODULE, MANUFACTURING METHOD FOR FUEL CELL MODULE, AND CONNECTOR

(71) Applicant: TOYOTA JIDOSHA KABUSHIKI KAISHA, Toyota (JP)

(72) Inventor: Masahiro Imanishi, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 412 days.

(21) Appl. No.: 17/483,317

(22) Filed: Sep. 23, 2021

(65) Prior Publication Data
US 2022/0013866 A1 Jan. 13, 2022

Related U.S. Application Data

(62) Division of application No. 16/014,204, filed on Jun. 21, 2018, now Pat. No. 11,158,909.

(30) Foreign Application Priority Data

Jun. 26, 2017 (JP) ................. 2017-124056

(51) Int. Cl.
*H01M 8/2475* (2016.01)
*H01M 8/0247* (2016.01)
(Continued)

(52) U.S. Cl.
CPC ....... *H01M 8/2475* (2013.01); *H01M 8/0247* (2013.01); *H01M 8/04552* (2013.01);
(Continued)

(58) Field of Classification Search
CPC ............. H01M 8/2475; H01M 8/0247; H01M 8/04552; H01R 13/627
See application file for complete search history.

(56) References Cited

U.S. PATENT DOCUMENTS

2003/0072983 A1 4/2003 Kikuchi et al.
2013/0236805 A1 9/2013 Furuya et al.
(Continued)

FOREIGN PATENT DOCUMENTS

| DE | 10 2013 112 412 A1 | 5/2014 |
|----|---|---|
| JP | 2013-187050 A | 9/2013 |
| JP | 2016-062713 A | 4/2016 |

OTHER PUBLICATIONS

U.S. Appl. No. 16/014,204, filed Jun. 21, 2018.
(Continued)

*Primary Examiner* — Stewart A Fraser
(74) *Attorney, Agent, or Firm* — Finnegan, Henderson, Farabow, Garrett & Dunner, LLP

(57) ABSTRACT

A connector includes a protrusion. The protrusion protrudes toward a distal end side to serve as a distal end of the connector. The connector moves in a diagonal direction relative to a first separator. A worker positions the connector in a Z direction, before moving the connector. With an upward protrusion and an inward protrusion formed, the worker standing by a first side wall looks into a casing from above to see a portion around an attachment portion. When the connector is positioned close to the attachment portion, the worker looking into the casing from above cannot see a bottom surface of the connector. The worker can see the protrusion even when he or she cannot see the bottom surface.

5 Claims, 9 Drawing Sheets

(51) Int. Cl.
*H01M 8/04537* (2016.01)
*H01R 13/627* (2006.01)
*H01R 24/20* (2011.01)

(52) U.S. Cl.
CPC .......... *H01R 13/627* (2013.01); *H01R 24/20* (2013.01); *H01R 2201/26* (2013.01)

(56) References Cited

U.S. PATENT DOCUMENTS

2014/0141640 A1   5/2014  Nagashima
2018/0241068 A1*  8/2018  Imanishi ............ H01M 8/0247

OTHER PUBLICATIONS

Office Action issued in U.S. Appl. No. 16/014,204 on Feb. 21, 2020.
Final Office Action issued in U.S. Appl. No. 16/014,204 on Aug. 17, 2020.
Advisory Action issued in U.S. Appl. No. 16/014,204 on Oct. 9, 2020.
Office Action issued in U.S. Appl. No. 16/014,204 on Feb. 16, 2021.
Notice of Allowance issued in U.S. Appl. No. 16/014,204 on Aug. 4, 2021.

\* cited by examiner

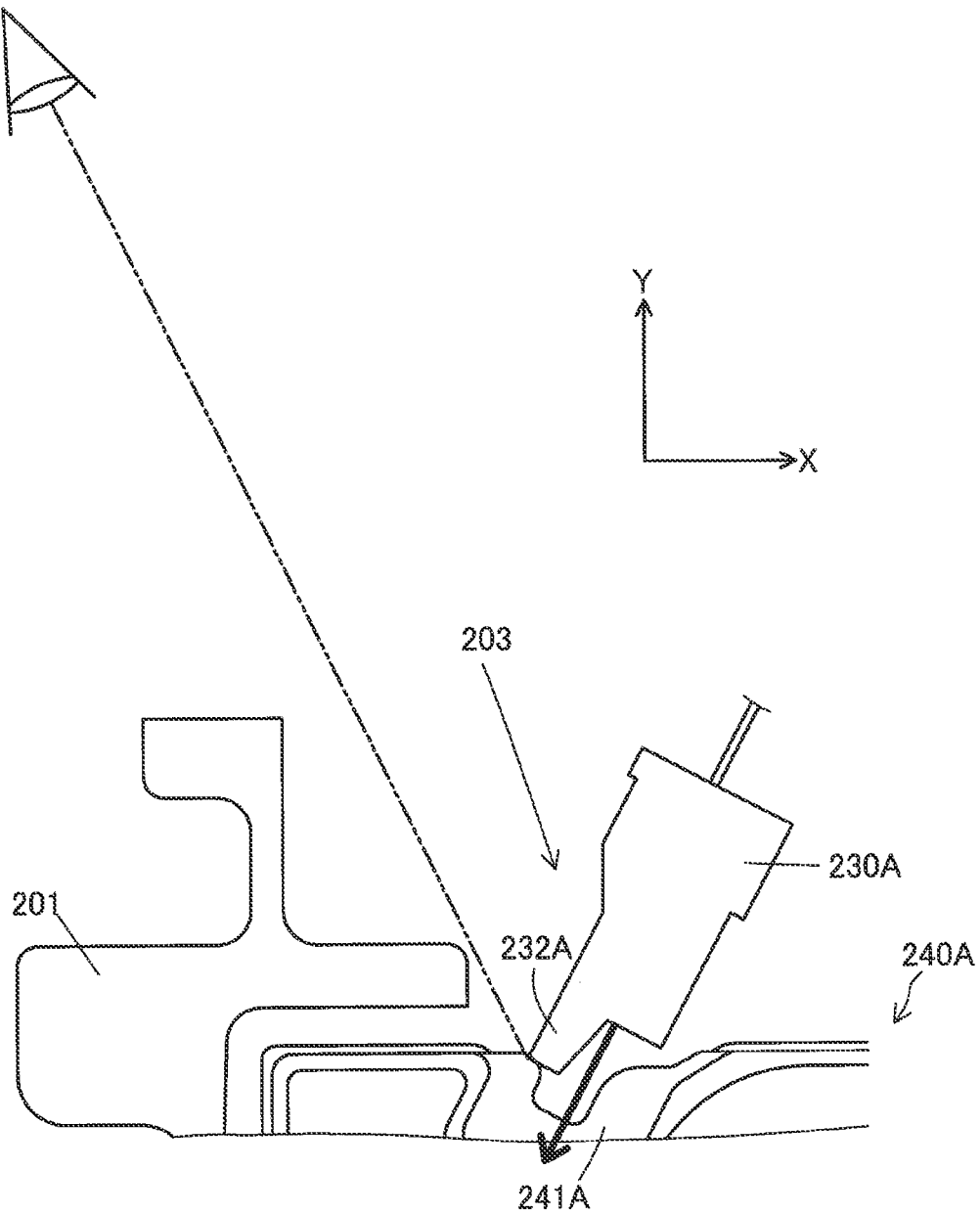

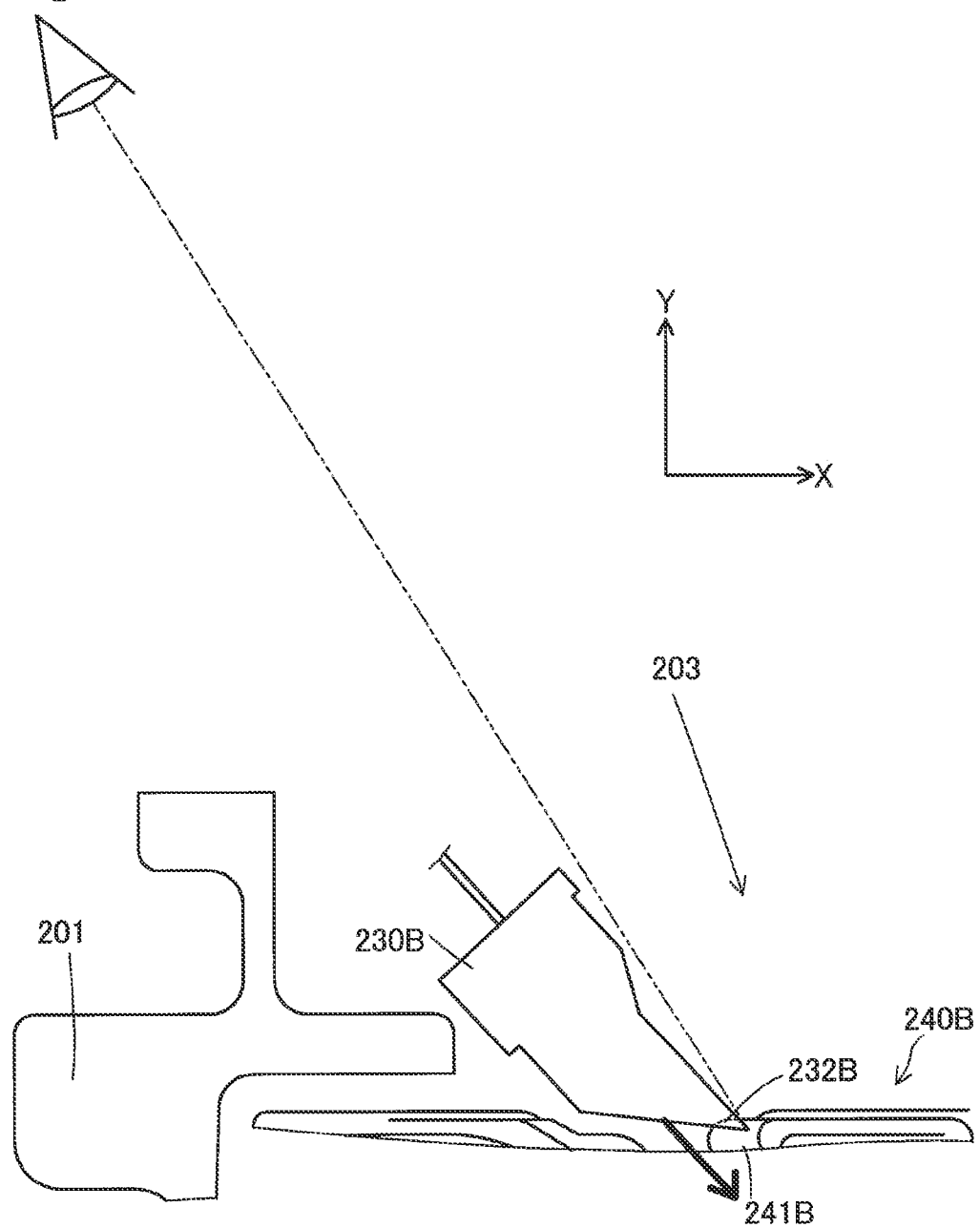

FUEL CELL MODULE, MANUFACTURING METHOD FOR FUEL CELL MODULE, AND CONNECTOR

CROSS-REFERENCE TO RELATED APPLICATION

The present application is a divisional of U.S. application Ser. No. 16/014,204, filed Jun. 21, 2018, which claims priority to Japanese Patent Application No. 2017-124056, filed Jun. 26, 2017, the disclosures of each of which are incorporated herein by reference in their entirety.

BACKGROUND

Field

The present disclosure relates to a connector for measuring cell voltage of a fuel cell.

Description of Related Art

JP2016-062713A discloses a method of placing a stack of cells in a casing by moving the stack in a stacking direction.

This technique does not take a connector attaching operation into consideration. The connector is a component attached to each of the cells, for measuring cell voltage. When the stack is accommodated in the casing through the technique disclosed in JP2016-062713A, the connector is attached after the stack is accommodated in the casing.

Unfortunately, the operation of attaching the connector after accommodation of the stack into the casing may be hindered by the casing. In view of the above, the present disclosure is directed to facilitating an operation of attaching a connector after a stack has been accommodated in a casing.

SUMMARY

According to an aspect of the present disclosure, there is provided a method of manufacturing a fuel cell module. The method comprises the steps of: placing a stack of a plurality of cells in a casing by moving the stack relative to the casing in a stacking direction of the stack, the casing having an opening to have at least a part of an upper surface of the casing open; and attaching, by a worker, a connector for use in measuring voltage of the cells to a specific portion of at least one of the cells in the casing, the specific portion being exposed from the casing through the opening. The connector includes a protrusion serving as a distal end of the connector. The step of attaching a connector includes pushing the connector to a predetermined position after the worker visually confirms that the protrusion is in contact with the cell that is an attachment target.

With this aspect, the worker will be prevented from failing to confirm that a cell to which he or she is about to attach the connector is the cell that is the attachment target due to the casing hindering visual recognition of the distal end of the connector, in the attaching of the connector. Thus, higher workability will be achieved.

In the above-described aspect, the cells each may have a substantially rectangular outer shape, and the step of attaching a connector may include attaching the connector by moving by the worker the connector in parallel with a surface direction of the cells and in a diagonal direction relative to the outer shape of the cells in the attaching of the connector.

With this aspect, the worker will be prevented from failing the confirmation when moving the connector. Otherwise, the casing is likely to hinder the visual recognition of the distal end of the connector, particularly when the connector is moved.

In the above-described aspect, the diagonal direction may be a direction from an upward side toward a downward side and from a farther side toward a closer side viewed from the worker.

With this aspect, the worker will be prevented from failing the confirmation when moving the connector upward. Otherwise, the casing is likely to hinder the visual recognition of the distal end of the connector, particularly when the connector is moved upward.

In the above-described aspect, the casing may include a first side wall and a second side wall that are orthogonal to the surface direction of the cells, the connector may be attached at a position closer to the first side wall than to the second side wall, and the worker may stand by the first side wall in the step of attaching a connector.

With this aspect, the connector is attached at a position closer to the first side wall than to the second side wall, and the worker stands by the first side wall. This facilitates the work performed by the worker.

The present disclosure can be implemented with various aspects other than those described above. For example, the present disclosure can be implemented as a fuel cell module or a connector.

BRIEF DESCRIPTION OF DRAWINGS

FIG. 8 is a diagram illustrating a worker viewing a protrusion according to a second embodiment.
FIG. 9 is a diagram illustrating a worker viewing a protrusion according to a third embodiment.

DESCRIPTION OF EMBODIMENTS

Figure 1:
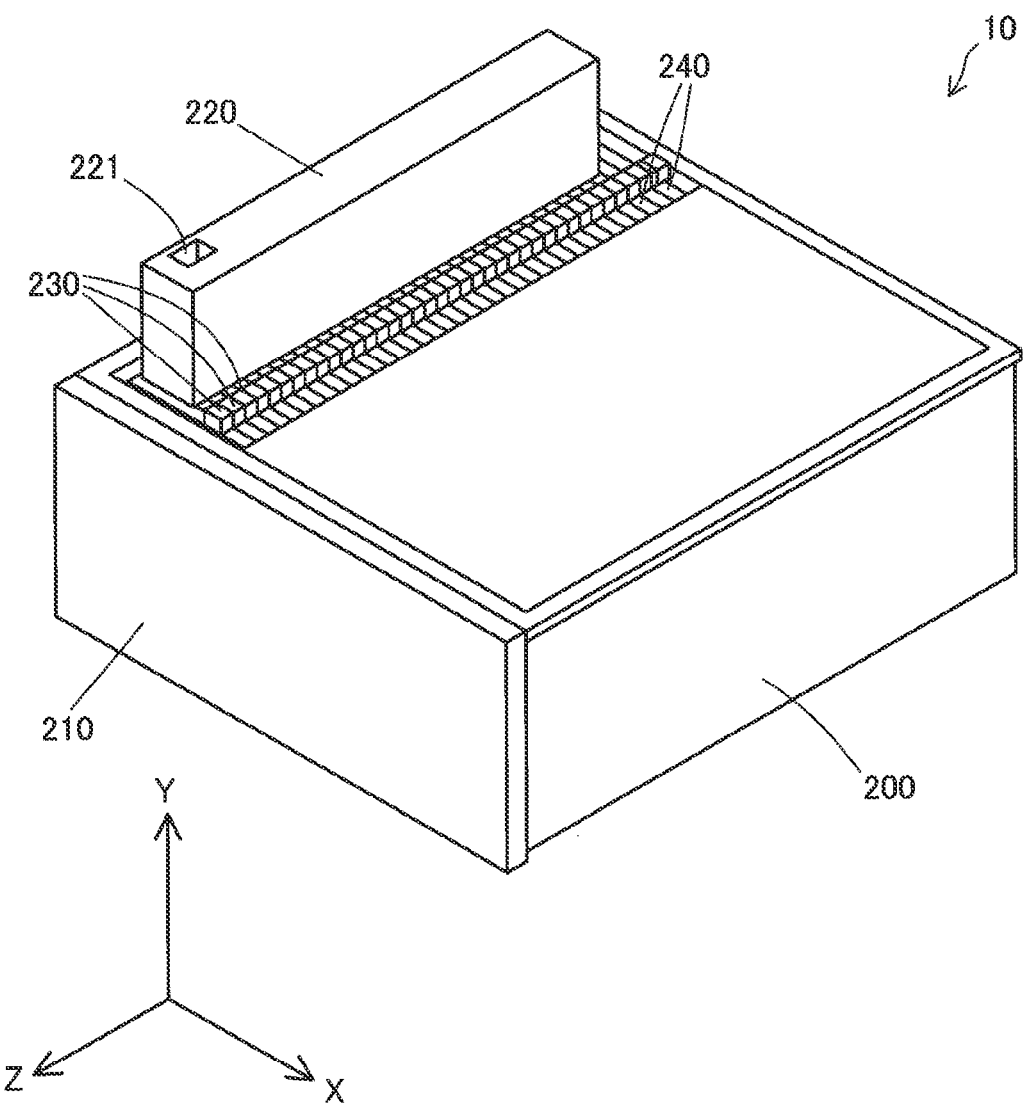
FIG. 1 is a perspective view illustrating a fuel cell module.

A first embodiment is described. FIG. 1 is a perspective view illustrating a fuel cell module 10. ZX plane is in parallel with a horizontal plane. +Y direction corresponds to upward in a vertical direction. −Y direction corresponds to downward in the vertical direction. XY plane is in parallel with a surface direction of cells 240. Z direction is in parallel with a stacking direction of the cells 240.

The fuel cell module 10 includes a casing 200, an end plate 210, a monitor 220, a plurality of connectors 230, and the plurality of cells 240. The number of the connectors 230 is the same as the number of the cells 240.

Figure 5:
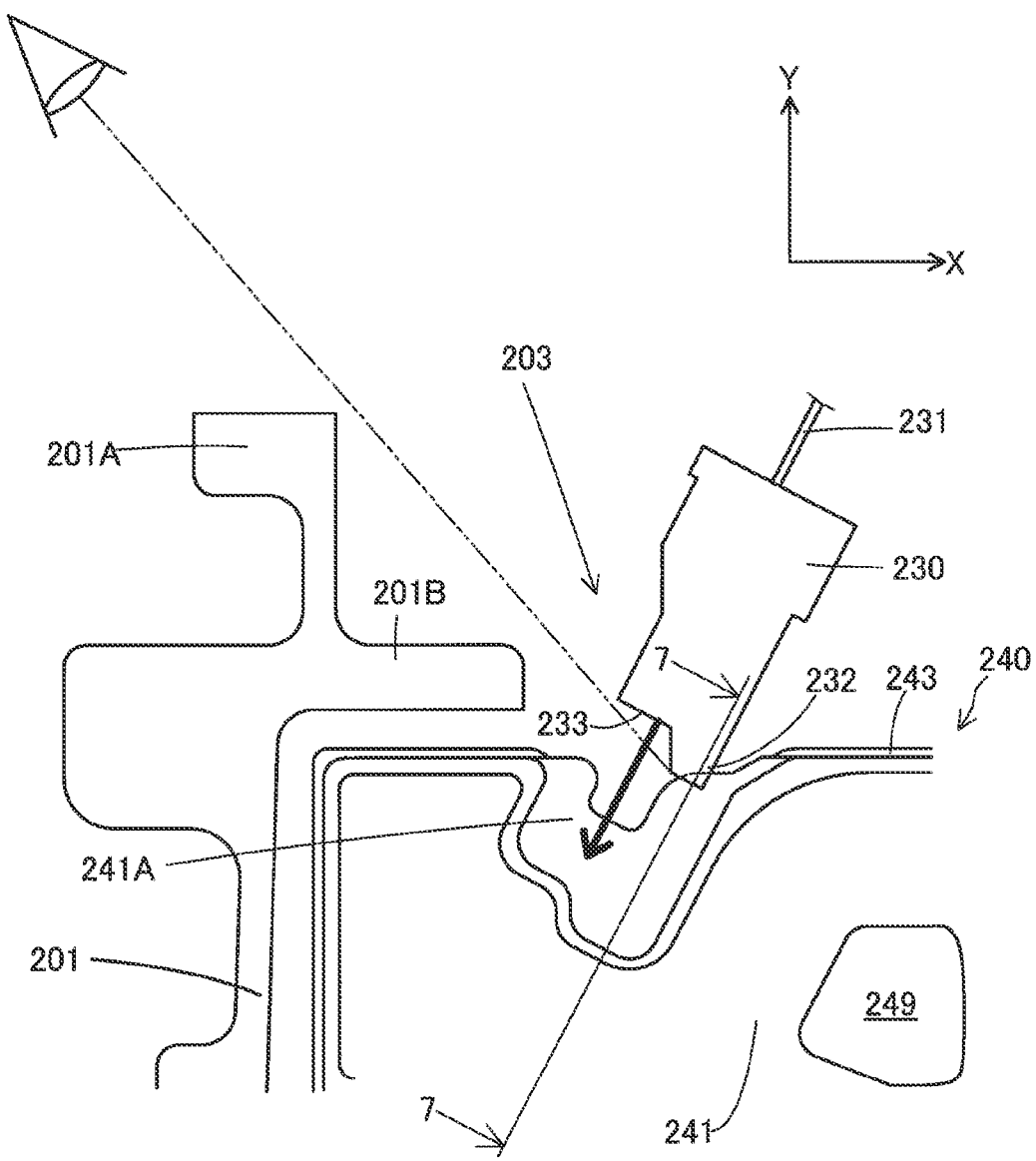
FIG. 5 is a diagram illustrating a worker viewing a protrusion.
Figure 6:
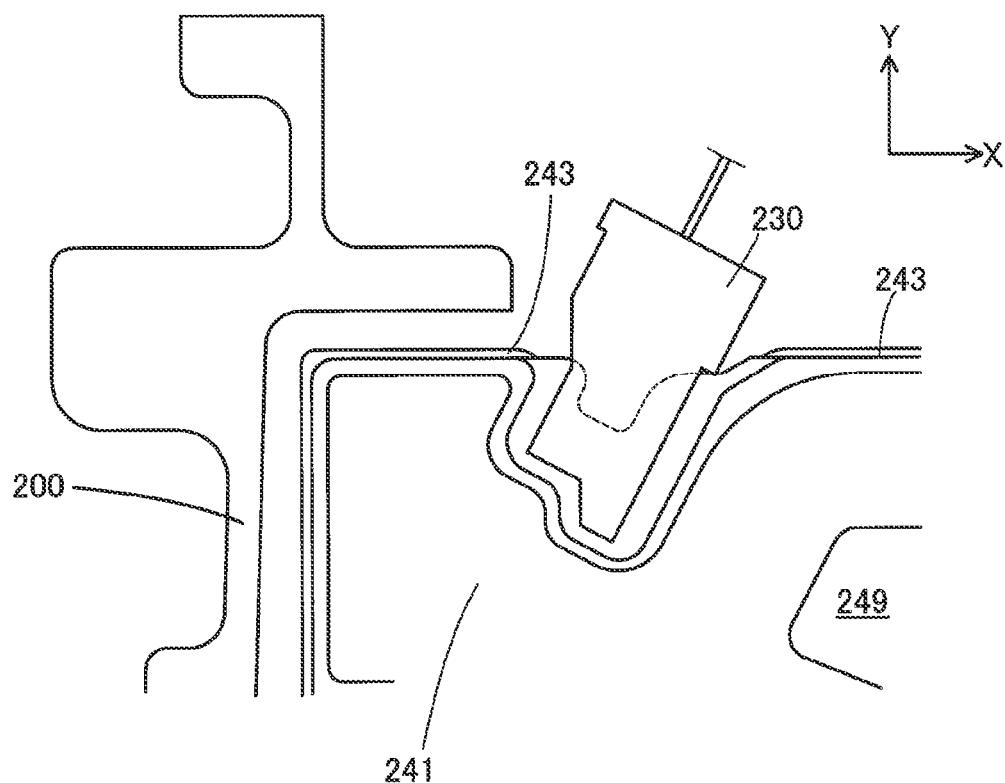
FIG. 6 is a diagram illustrating a connector attached.

The casing 200 accommodates the plurality of cells 240. The monitor 220 is fixed to an upper portion of the casing 200. The plurality of connectors 230 each is for use in measuring cell voltage. The plurality of connectors 230 are each connected to the monitor 220 through a cable 231 that is not illustrated in FIG. 1, but is illustrated in FIG. 5 and FIG. 6. The cell 240 is a unit cell. The connector 230 is an electric connector.

The monitor 220 has an upper portion provided with a connection unit 221. A result of detection with the monitor 220 will be acquired with a plug inserted in the connection unit 221. The result of detection denotes power generation voltage by each of the cells 240.

Figure 2:
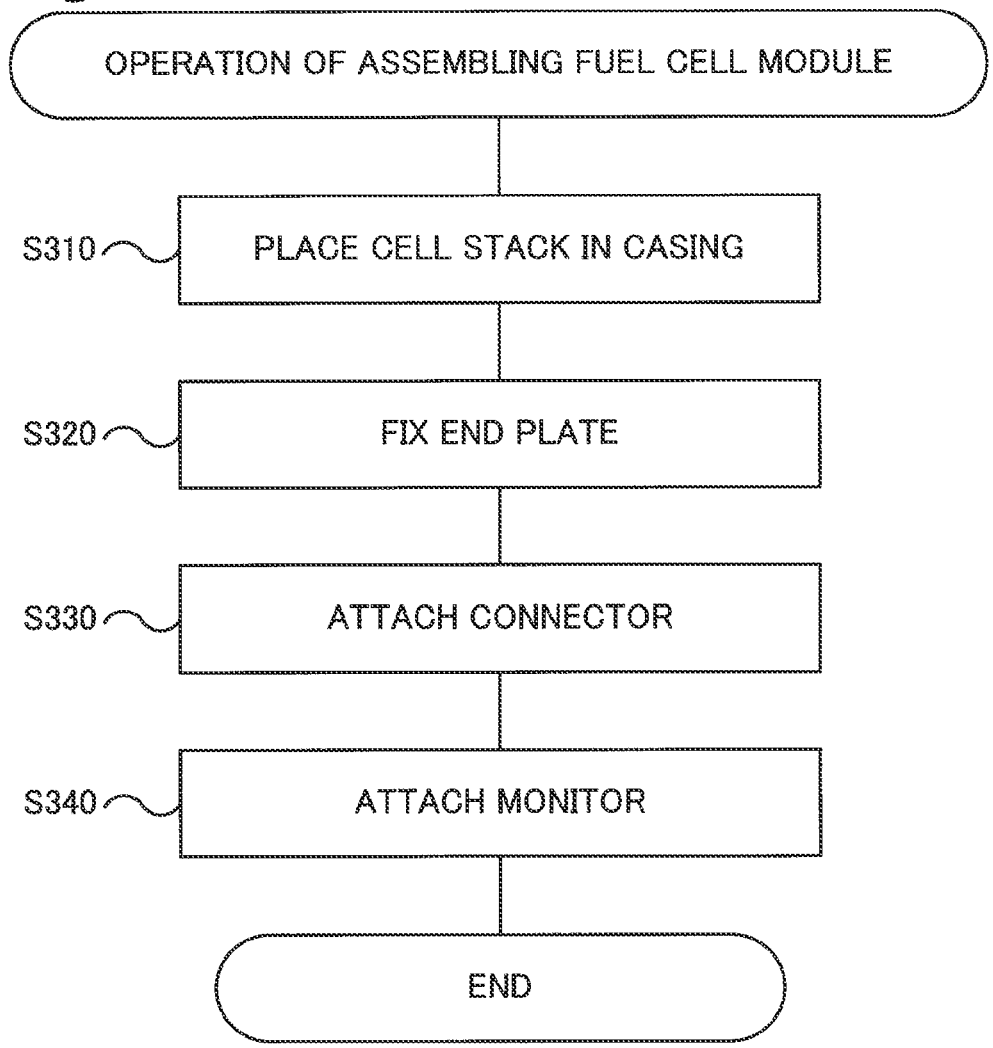
FIG. 2 is a flowchart illustrating an operation of assembling the fuel cell module.
Figure 3:
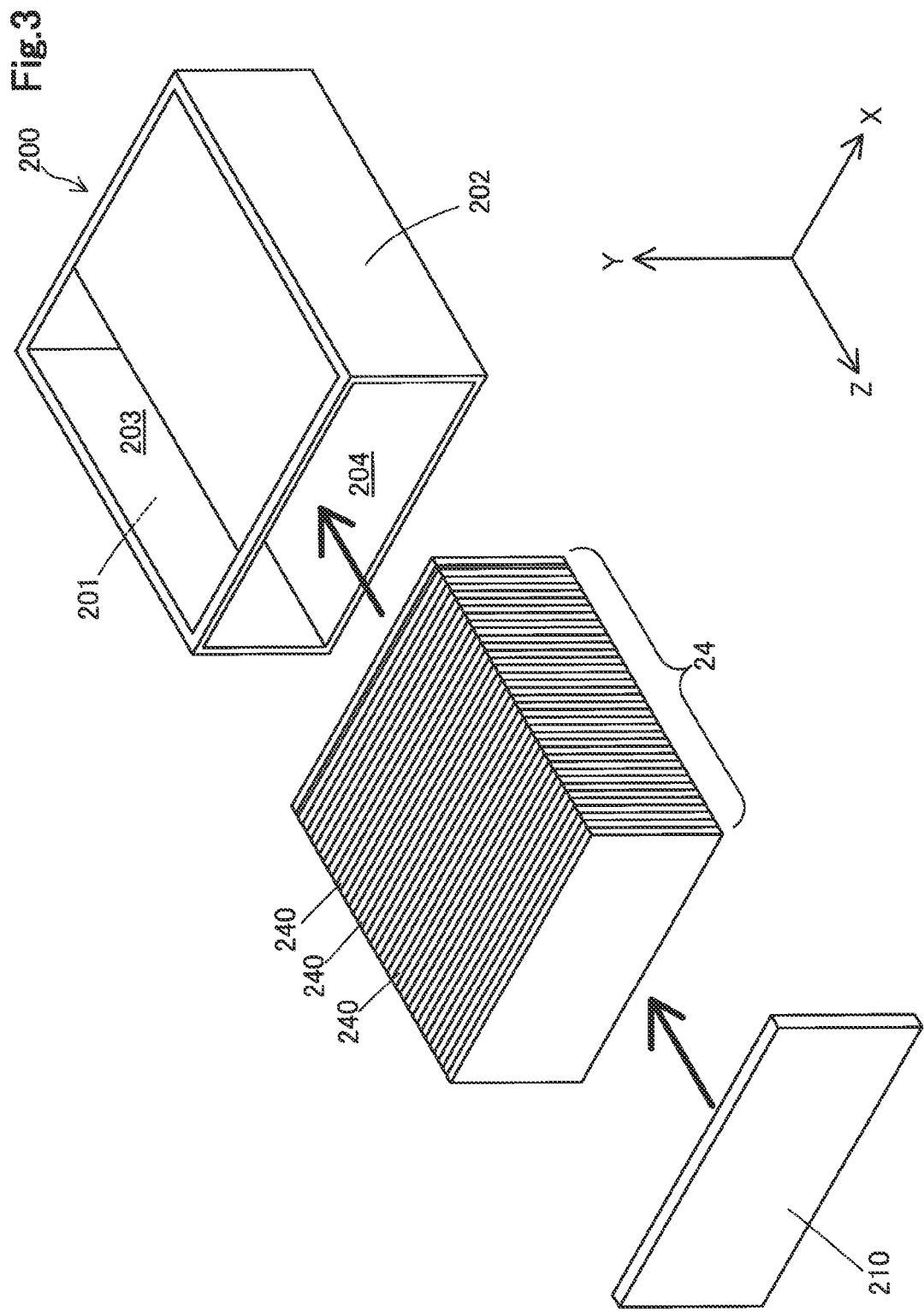
FIG. 3 is a perspective view illustrating an operation of placing cells in a casing and attaching an end plate.

FIG. 2 is a flowchart illustrating an operation of assembling the fuel cell module 10. As illustrated in FIG. 3, a worker places a stack 24 of the plurality of cells 240 in the casing 200 in step S310.

As illustrated in FIG. 3, the casing 200 includes a first side wall 201, a second side wall 202, an upper opening 203, and a side opening 204. The first side wall 201 and the second side wall 202 each have a surface orthogonal to the XY plane. Thus, the first side wall 201 and the second side wall 202 each have a surface orthogonal to the surface direction of the cells 240. The casing 200 has the upper opening 203 to have an upper surface open. The upper opening 203 is positioned closer to the first side wall 201 than to the second side wall 202.

The casing 200 has the side opening 204 to have one side open. The worker inserts the stack 24 into the casing 200 through the side opening 204. In this operation, the worker moves the stack 24 relative to the casing 200 in the Z direction (that is, in the stacking direction of the stack 24).

The cells 240 each have a substantially rectangular outer shape as illustrated in FIG. 3. Thus, the outer shape of the cell 240 projected onto the XY plane is a substantially rectangular shape.

Figure 4:
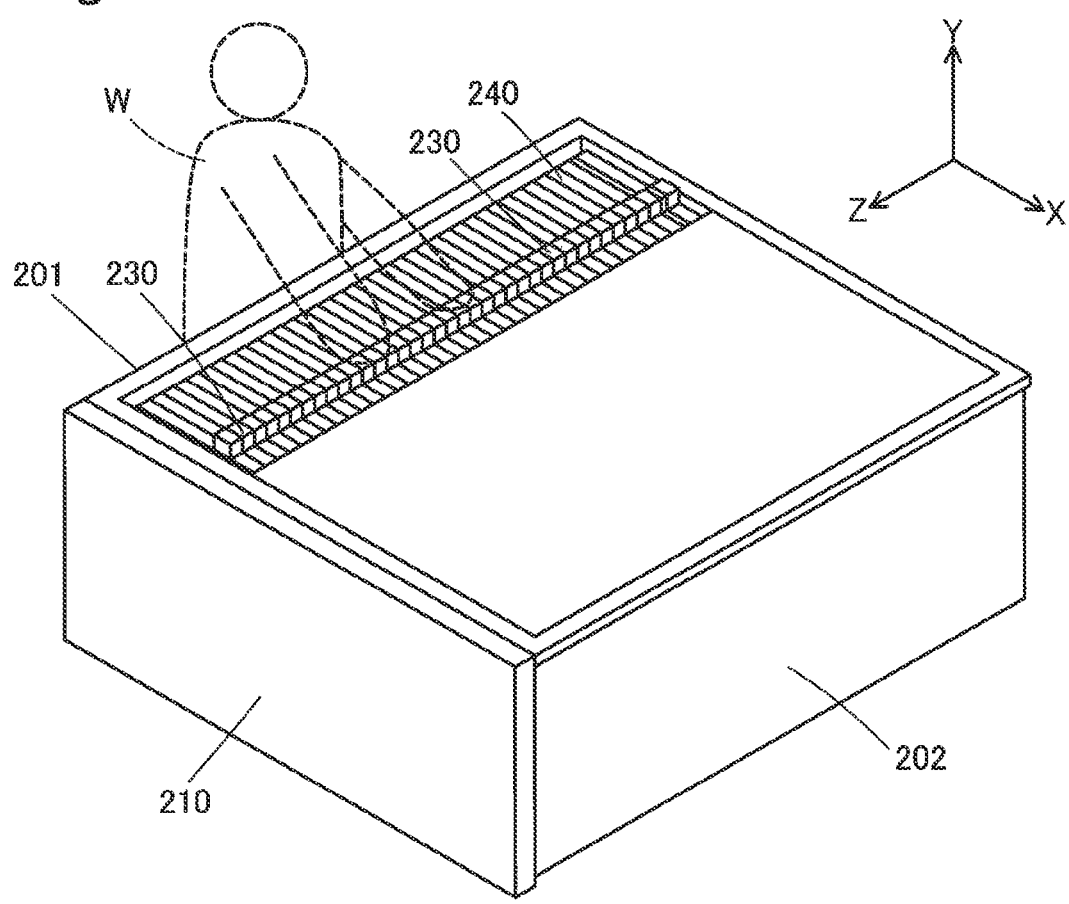
FIG. 4 is a perspective view illustrating an operation of attaching connectors.

Then, the worker fixes the end plate 210 in step S320. Next, a worker W attaches the connector 230 to the cell 240 in step S330. The connector 230 is attached to a portion where the cell 240 is exposed from the casing 200 through the upper opening 203 as illustrated in FIG. 4. The "worker W" is in charge of step S320. The term "worker" without the reference symbol "W" is in charge of operations other than that in step S320. Note that the worker W may also be in charge of the operations other than that in step S320.

As illustrated in FIG. 4, the connector 230 is attached to a position closer to the first side wall 201 than to the second side wall 202. Thus, the worker W performs the operation in step S320 while standing by the first side wall 201.

The operation in step S330 involves a jig. The worker W manually attaches the connectors 230 one by one to the cells 240. Then, the worker attaches the monitor 220 in step S340. When step S340 is completed, assembling of the fuel cell module 10 illustrated in FIG. 1 is completed.

Figure 7:
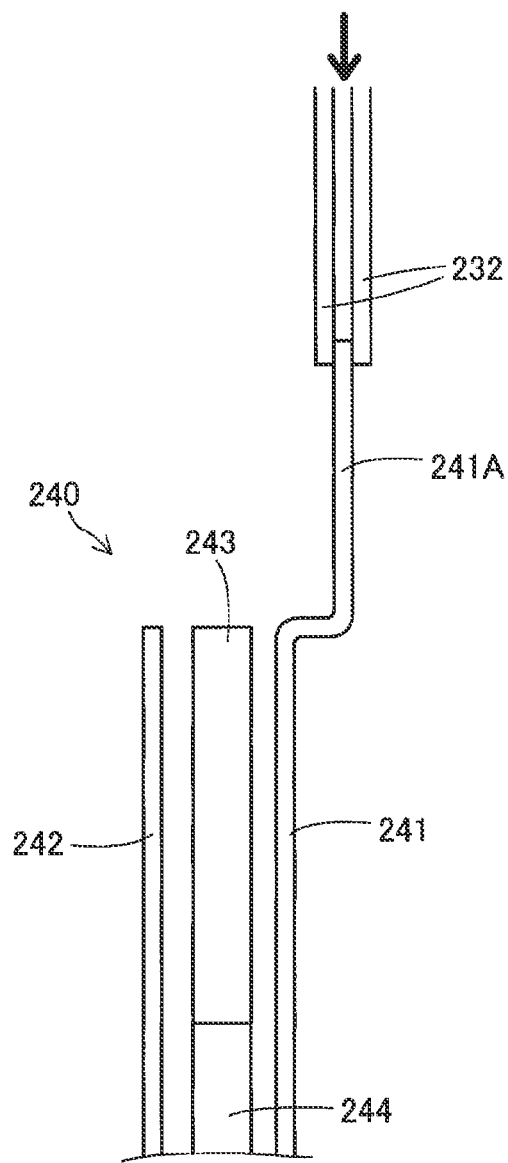
FIG. 7 is a cross-sectional view taken along the line 7-7 in FIG. 5.

FIG. 5, FIG. 6, and FIG. 7 are diagrams illustrating step S330 in detail. FIG. 5 and FIG. 6 illustrate the first side wall 201, a single cell 240, and a single connector 230. In the figures, the casing 200 has a cross section illustrated, and the single cell 240 and the single connector 230 each have a side surface illustrated instead of its cross section. FIG. 7 is a cross-sectional view taken along the line 7-7 in FIG. 5.

As illustrated in FIG. 7, the cell 240 includes a first separator 241, a second separator 242, an insulating frame 243, and a membrane electrode assembly 244. A portion of the cell 240 illustrated in FIG. 5 and FIG. 6 mainly includes the first separator 241. FIG. 5 and FIG. 6 also illustrate an insulating frame 243 provided to the area except for an attachment portion 241A, which will be described later. The insulating frame 243 separates the first separator 241 and the second separator 242 from each other.

The attachment portion 241A is formed as a part of the first separator 241, and the connector 230 is attached to the attachment portion 241A. The attachment portion 241A is protruded toward outside of and exposed from the second separator 242 and the insulating frame 243 as illustrated in FIG. 7.

The connector 230 includes a protrusion 232. The protrusion 232 protrudes toward the distal end side to serve as the distal end of the connector 230. The protrusion 232 is positioned on the farther side of the connector 230 as viewed from the worker W, that is, on a side farther from his or her body, in the X direction.

As illustrated in FIG. 5 and FIG. 6, the connector 230 is moved diagonally relative to the first separator 241. This diagonal direction is a direction inclined due to rotation about the Z direction, which is orthogonal to the surface direction of the cell 240. The worker W sees the connector 230 approaching his or her body, as he or she pushes the connector 230. Thus, the worker W moves the connector 230 in parallel with the surface direction of the cell 240, from the upward side toward the downward side, and from a farther side toward a closer side.

The attachment through such a diagonal movement is mainly intended to ensure a gap between the attachment portion 241A and a through hole 249. The through hole 249 will make a manifold in the fuel cell module 10 in the assembled state. The connector 230 thus diagonally attached has a distal end directed toward the first side wall 201.

The worker W can appropriately move the connector 230 along the XY plane direction (that is, a direction in parallel with the surface direction of the cell 240), by moving the connector 230 with some jig. Thus, the worker W positions the jig and the connector 230 in the Z direction before moving the connector 230. In other words, the worker W performs the positioning in the Z direction so that the attachment operation will be appropriately done to the cell 240 that is an attachment target, in the plurality of cells 240 stacked in the Z direction.

As illustrated in FIG. 5, the first side wall 201 includes an upward protrusion 201A and an inward protrusion 201B. The upward protrusion 201A is a portion protruding upward from a portion around an upper end of a main portion of the first side wall 201. The upward protrusion 201A protrudes upward beyond an upper end of the first separator 241.

The inward protrusion 201B is a portion protruding toward the inner side of the casing 200 from a portion around the upper end of the main portion of the first side wall 201. The inward protrusion 201B is positioned more on the upward side than the upper end of the first separator 241.

With the upward protrusion 201A and the inward protrusion 201B thus formed, the worker W standing by the first side wall 201 looks into the casing from above to see a portion around the attachment portion 241A. When the connector 230 is positioned close to the attachment portion 241A, the worker W looking into the casing from above cannot see a bottom surface 233 of the connector 230.

The worker W, however, is able to see the protrusion 232 even when he or she cannot see the bottom surface 233. In other words, in the present embodiment, the protrusion 232 is designed to have such a size and a shape as to be visible by the worker W as soon as the protrusion 232 starts to contact with the attachment portion 241A.

Thus, the worker W is able to confirm that the protrusion 232 is in contact with the attachment portion 241A of the cell 240 that is the attachment target. Specifically, the worker W is able to confirm that the protrusion 232 is clamping the attachment portion 241A of the cell 240 that is the attachment target. After confirming this, the worker W further pushes the connector 230 to a predetermined position as illustrated in FIG. 6. Thus, the attachment operation is completed.

In the present embodiment, the worker W will be prevented from erroneously attaching the connector 230 to a cell 240 that is not the attachment target. This effect will also be obtained also in a case where the connector 230 is temporarily pulled out and then is attached again for a repairing purpose.

Next, a second embodiment is described. The second embodiment is described by mainly focusing on differences from the first embodiment. Matters not elaborate upon here are the same as those in the first embodiment.

FIG. 8 illustrates the first side wall 201, a single cell 240A, and a single connector 230A. In the second embodiment, the cell 240A is used instead of the cell 240, and the connector 230A is used instead of the connector 230.

The connector 230A includes a protrusion 232A. The protrusion 232A is positioned on the closer side of the connector 230A as viewed from the worker W.

In other words, the protrusion 232A is positioned on the side close to the worker W in the X direction, as viewed from the worker W. In step S330, the worker W is able to confirm that the protrusion 232A is clamping the attachment portion 241A of the cell 240A that is the attachment target.

A third embodiment is described. The third embodiment is described by mainly focusing on differences from the first embodiment. Matters not elaborate upon here are the same as those in the first embodiment.

FIG. 9 illustrates the first side wall 201, a single cell 240B, and a single connector 230B. In the third embodiment, the cell 240B is used instead of the cell 240, and the connector 230B is used instead of the connector 230.

The worker W pushes the connector 230B from the upward side toward the downward side, and also from the closer side toward the farther side.

The connector 230B includes a protrusion 232B. The connector 230B is different from the connector 230 in the first embodiment in that the bottom surface is not provided. Thus, the protrusion 232B is a sharp tapered portion around the distal end of the connector 230B, unlike the protrusion 232 in the first embodiment.

The protrusion 232B is positioned on the farther side of the connector 230B as viewed from the worker W. In step S330, the worker W is able to confirm that the protrusion 232B is clamping an attachment portion 241B of the cell 240 that is the attachment target.

The present disclosure is not limited to the embodiments and the examples described above, and may be implemented in various ways without departing from the gist of the present disclosure. For example, the technical features in the embodiments and the examples corresponding to the technical features in each aspect described in the summary section can be replaced or combined as appropriate in order to partially or entirely solve the problem described above or to partially or entirely achieve the advantageous effects described above. Some technical features that are not described as being essential herein can be omitted as appropriate. An example of such a modified configuration includes the following.

The protrusion may have any shape as long as the worker will be prevented from failing to confirm that a cell to which he or she is about to attach the connector is the cell that is the attachment target due to the casing hindering visual recognition of the distal end of the connector, in the attaching of the connector.

What is claimed is:

1. A fuel cell module comprising:
   a stack of a plurality of cells;
   a casing that has an opening to have at least a part of an upper surface of the casing open, the casing being configured to accommodate the cells; and
   a connector for use in measuring voltage of the cells, the connector being attached to at least one of the cells,
   wherein the connector is attached at a position exposed through the opening and includes a protrusion serving as a distal end of the connector, wherein the protrusion is visibly protruding at the distal end of the connector when viewed in a stacking direction of the cells.

2. The fuel cell module according to claim 1, wherein the cells each have a substantially rectangular outer shape, and
   the connector is attached in a diagonal direction relative to the outer shape of the cells.

3. The fuel cell module according to claim 2, wherein the casing includes a first side wall and a second side wall that are orthogonal to a surface direction of the cells, and
   the connector is attached at a position closer to the first side wall than to the second side wall and in an inclined manner such that the distal end of the connector is directed toward the first side wall.

4. The fuel cell module according to claim 1, wherein the protrusion is formed closer to one of opposite sides of the connector than to a center of the connector.

5. The fuel cell module according to claim 1, further including a monitor disposed above the connector such that the connector is housed in the monitor, wherein the monitor is electrically connected to the connector through a cable.

* * * * *